Jan. 25, 1949.  G. C. SOUTHWORTH  2,460,109
ELECTRICAL TRANSLATING DEVICE
Filed March 25, 1941  2 Sheets-Sheet 1
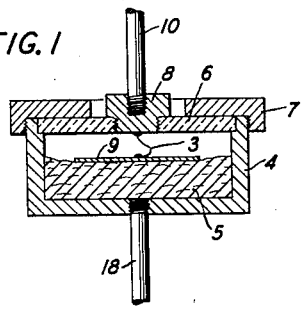
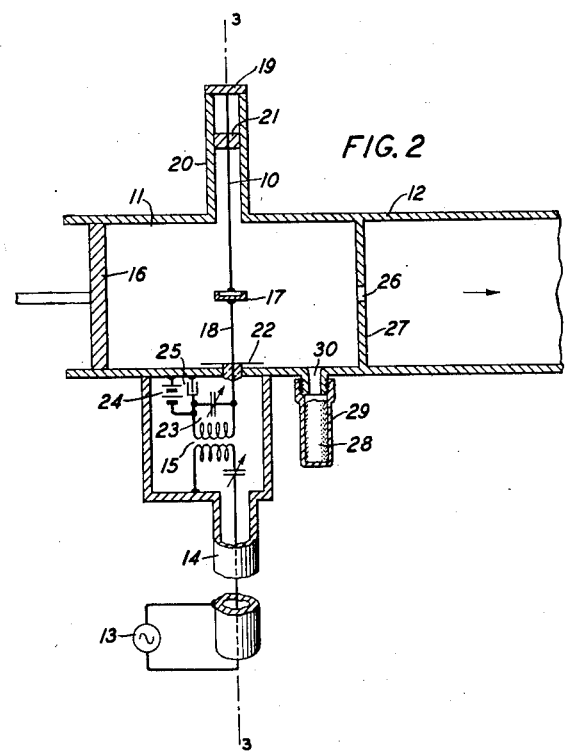
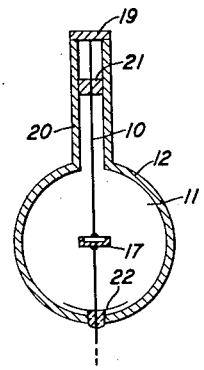
INVENTOR
G. C. SOUTHWORTH
BY
E. V. Griggs
ATTORNEY Jan. 25, 1949.                G. C. SOUTHWORTH                2,460,109
                          ELECTRICAL TRANSLATING DEVICE
Filed March 25, 1941                                    2 Sheets-Sheet 2

INVENTOR
G. C. SOUTHWORTH
BY
E. V. Griggs
ATTORNEY

Patented Jan. 25, 1949

2,460,109

UNITED STATES PATENT OFFICE 2,460,109

ELECTRICAL TRANSLATING DEVICE

George C. Southworth, Red Bank, N. J., assignor to Bell Telephone Laboratories, Incorporated, New York, N. Y., a corporation of New York Application March 25, 1941, Serial No. 385,054

13 Claims. (Cl. 179—171.5)

This invention relates to electrical translating devices comprising electrets.

An object of the invention is to utilize the electrical saturation properties of electrets in an asymmetrical or non-linear electrical translating device such as a harmonic generator or a modulator.

Another object of the invention is to increase the efficiency of asymmetrically conducting devices used for conversion of the wave form or frequency of electrical oscillations or impulses by use of an asymmetric reactance element as distinguished from the asymmetric resistances commonly employed.

If a parallel plate condenser be filled with a specially prepared molten wax dielectric such as carnauba wax or beeswax or a mixture of the two, and an electric potential be impressed between the plates while the wax is hardening, the device will exhibit a more or less permanent electrification apparently occasioned by the electric charges bound in the dielectric. Devices of this type were described by Mototaro Eguchi in an article in Philosophical Magazine, vol. 39, 1925, page 178. A. Gemant has also studied electrets and in an article appearing at Philosophical Magazine No. 7, Series 20, 1935, page 929, notes that experiments indicate that the curve relating charge with the polarization field indicates an electric saturation with fields of the order of 5 to 10 kilovolts per centimeter.

In accordance with the invention an electret polarized at a sufficiently high potential to render the device electrically saturated is employed as a non-linear translation device in a harmonic generator or modulator.

The invention may be best understood by reference to the following description taken in connection with the accompanying drawing, in which:

Fig. 1 illustrates a section of one embodiment of an electret in accordance with this invention.

Fig. 2 illustrates schematically a harmonic generating system utilizing the device of Fig. 1;

Fig. 3 is a partial section along line 3—3 of Fig. 2;

Figure 4:
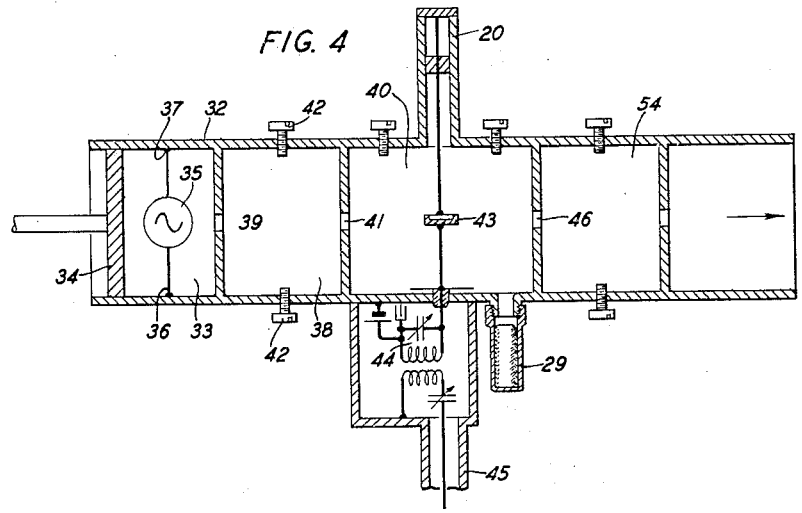
Fig. 4 illustrates schematically a wave guide system for modulating carrier waves utilizing an electret as the modulating element.

Referring to Fig. 1 an electrically conducting receptacle 4 serves as a container for a mass of dielectric material 5. The composition of this material and the method of polarizing the material may follow the practice outlined in an article by Good and Stranathan appearing at page 810 of the Physical Review, vol. 56, October 15, 1939. The dielectric may, therefore, comprise equal weights of resin and carnauba wax initially heated to a temperature of the order of 90° C. After heating sufficiently long to expel occluded air the material is allowed to cool to 75° C. at a rate determined by surrounding temperatures. The receptacle 4 may be used as the lower electrode. An upper electrode may be suitably supported above the molten dielectric material and may have such a diameter as to permit the upper electrode to just make contact with the upper surface of the dielectric material with sufficient clearance at its periphery to avoid any spark over to the lower electrode. When the material has cooled to a temperature of 75° C. a unidirectional electromotive force sufficient to impress an electric field of 8000 volts per centimeter may be applied between the two electrodes. The polarizing electromotive force is maintained until the dielectric material has cooled to room temperature. Thereupon the upper electrode may be removed. A moisture excluding cover 6 of dielectric material is fitted closely into the enlarged upper portion of the container 4. It is clamped in place by a conducting cap 7 which is provided with interior threads engaging with threads on the outer periphery of the container 4. A central supporting and lead-in plug member 8 screws into a threaded aperture at the center of plate 6. A leaf spring 3 electrically connected at its upper end with the plug member 8 makes contact at its lower end with the conducting plate 9 which is attached to the upper surface of the electret 5. This serves to complete the electrical connection from the upper surface of the electret to the conducting and supporting rod 10. As an alternative the plate 9 may be omitted and a suitably shaped and dimensioned lower end of the leaf spring 3 may make the necessary contact with the upper surface of the electret.

The electret dielectric member 5 of the device of Fig. 1 may have a diameter of approximately 1 centimeter and a thickness of the order of 2 millimeters.

The electret of Fig. 1 formed under such conditions as to receive a saturating electric charge may, in accordance with the invention, serve as an asymmetric or non-linear conducting device because of the fact that an electromotive force applied in one direction is unable to increase the charge between the electric terminals of the electret whereas an oppositely directed electromotive force is presented by the device with an effective capacitance. Under these circumstances the current flow in an external circuit in which the electret is introduced is no longer proportional to the impressed electromotive force but varies in much the manner of a current resulting from an alternating electromotive force impressed upon the winding of a saturated magnetic core, so that in one direction the half-cycle impulses may be substantially zero or at least very small, and, moreover, not linearly proportional to the impressed electromotive force, while in the opposite direction the half-cycle current impulses are relatively large.

Fig. 2 illustrates a system in which a resonance chamber section 11 of a wave guide 12 together with a tuned electret 17 is used to obtain harmonic power from a source 13 of fundamental or base frequency oscillations. The source 13 is connected to the electret 17 by means of a coaxial input line 14 and a tuned coupler 15. It is the function of the tuning coupler 15 and its associated elements to impress on the electret 17 a maximum of fundemental frequency power from the source 13.

The electret 17 which may be of the type disclosed in Fig. 1 is electrically connected to the upper and lower supporting members 10 and 18, respectively, and is held in position approximately along the axis of the wave guide chamber 11. It will be observed that these connections place the electret across the secondary of the coupler 15.

At this point, it is convenient to think of the electret as a new power source made up of a large number of component electromotive forces each corresponding to a harmonic of the base frequency. Which one of these components will be favored to produce useful power will depend on the nature of the load into which the new source is to operate. In the case at hand the wave guide 12 serves as the load and the tuned chamber 11 determines the order of the harmonic to be accepted.

The process of tuning is one whereby a low impedance is presented to the wanted component and a high impedance to the unwanted components. Since these latter impedances are of a non-dissipative kind, the transfer is relatively efficient with the result that power that might otherwise have resided in unwanted components is transferred to the preferred component. After manifesting itself in the chamber this harmonic power passes through the iris 26 to the connecting pipe where it is led away.

In order to bring about this result the various components are connected as follows: Referring to the low frequency paths it will be observed that the electret 17 is placed across the parallel-circuit 23, the low frequency circuit being completed through the walls of the guide. Following the high frequency or harmonic circuit one observes that currents arising from the electret tend to flow downward through condenser 22 formed by a plate attached to the supporting conductor 18, the plate being spaced and insulated from the chamber wall by the insulating bead through which the support 18 passes. These currents pass through condenser 22 to the walls of the guide and upward to the coaxial tuner 20 and thence back to the electret 17. These, of course, are the connections appropriate for launching in the guide 11 the H₁₁ type of wave. The chamber 11 may be tuned by means of the piston 16 and the adjustable coaxial tuner to support the desired harmonic. In addition to serving as a tuner the coaxial provides a convenient way of placing one-half of a standing wave symmetrically across the pipe.

It will be seen from the above that the circuits associated with the electret provide two rather different forms of transformers. In one case the transformer 15 matches, at the fundamental frequency, the coaxial feed line to the electret. In the other the tuned chamber 11 acting as a rather unusual form of a transformer matches, at the preferred harmonic frequency, the electret 17 to the pipe 12.

In practice the system should be proportioned with regard to the frequencies involved so that fundamental power led into the chamber through the coaxial line will not be propagated away through the guide. In addition, harmonic power developed in the electret should not be admitted to the coaxial line. The former is made possible by setting the critical or cut-off diameter of the pipe to discriminate against the fundamental frequency. The second condition is met by setting the by-pass condenser 22 together with the tuned circuit 23 to prevent harmonic power from entering the coaxial line.

Inasmuch as the performance of an electret is adversely affected by humidity the entire structure enclosing the electret is preferably atmospherically sealed. A desiccating material as indicated at 28 may be included within a gauze capsule placed in a small side tube 29 communicating through its open end with the space within the resonance chamber. The diameter of the side tube is made too small to permit entrance of the oscillation energy from chamber 11. Moreover, if desired as an additional precaution against deleterious electrical effects by the side tube 29, the mouth of the tube may be covered with fine wire gauze 30. The active desiccating agent may be anhydrous calcium sulphate. The side tube 29 may be readily removed and a replacement unit 28 slipped in place.

It is also desirable that surface charges which accumulate upon the electret may be short-circuited particularly in periods when the device is not in use. It will be appreciated that, except for the by-pass condenser 25, the conductive path afforded by supports 10 and 18, the tuning plunger 21, the wave guide, and the winding of the tuned circuit 23 will serve to remove such surface charges.

When operated at high energy levels an electret may serve as an asymmetric translating device with no other fixed bias than that of its inherent electrical charge. When operated at very low levels it may be desirable to include the source 24 of series biasing electromotive force so as to carry the operating point to a non-linear region of the operating characteristic of the electret. The biasing source when used should, of course, be directed with respect to polarity in the same manner as the biasing electromotive force by which the electret was formed so as to tend to increase the charge, if possible, thereby assuring charge saturation of the electret. The by-pass condenser 25 serves as a low impedance shunt around source 24 for the oscillations. When the system is not to be in operation for some time, the source 24 should be electrically disconnected and replaced by a short circuit to preserve the effectiveness of the electret which may otherwise be subjected to the deleterious influence of accumulated surface charges.

Fig. 3 indicates in section the structure of the resonance chamber 11. In an actual apparatus this chamber may have a length and a diameter each of the order of 7 or 8 centimeters. These dimensions will, of course, be determined by the frequency of the oscillations with which the system is designed to operate.

Fig. 4 illustrates a modulation system employing an electret as the modulating element and a wave guide for directing the modulated energy. In the system of Fig. 4 a wave guide 32 having a tunable resonance chamber 33 provided with a tuner 34 is associated with a source 35 of carrier waves to be modulated. The source 35 may be located within the chamber 33 and in any event may be connected to diametrically opposite points 36 and 37. A filter section 38 comprising a cavity resonant at the carrier frequency may be loosely coupled to chamber 33 by an opening or iris 39 and to the modulating chamber 40 by an iris 41. The resonance frequency of cavity 38 may be varied by the frequency varying screws 42 threaded through its walls at substantially opposite central points. An electret 43 is supported within the chamber 40 in the manner already described in connection with the electret 17 of Fig. 2. Associated with its external tuned circuit 44 which is broadly selective for incoming currents and the capacitance of which by-passes oscillations from the source 35 is an input coaxial line 45 by which incoming speech currents or other modulating waves may be impressed directly across the terminals of the electret. The coaxial tuner 20 and the desiccating side tube 29 are provided as in the apparatus of Fig. 1. A second resonant cavity filter section 54 similar to cavity 38 is coupled by an aperture 46 to the modulating chamber 40 to receive therefrom oscillations of the carrier frequency which have been modulated in accordance with the signal impulses or oscillations from the coaxial line 45. Carrier oscillations impressed upon the modulating chamber 40 from the source 35 and resonant cavity 38 will serve to set up an electromotive force between the diametrically opposite points to which the supports of the electret 43 are connected. In consequence of the non-linear characteristic of the device 43 and the simultaneous superposition upon it of electromotive forces of the signal oscillations from coaxial 45 and of the carrier oscillations from cavity 38 there will be set up in the circuit of the electret 43 combination frequency components representing the modulation side-bands. These modulated waves appearing in the chamber 40 may then be propagated to the right along the wave guide through the selective section.

Figure 5:
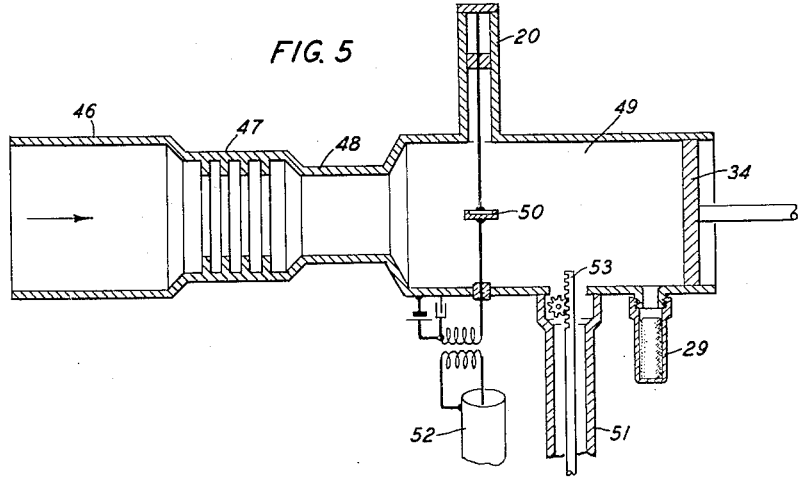
Fig. 5 portrays a wave guide receiving system for cooperating with the transmitter of Fig. 4.

Fig. 5 illustrates a wave guide receiving system which may be employed to receive and detect modulated waves such as those directed to the right in the system of Fig. 4. The incoming wave guide 46 may include a filter section 47 designed in accordance with the principles of the copending application, Serial No. 359,643, filed October 4, 1940, since abandoned, to transmit along the wave guide, in the direction indicated by the arrow, a desired band including the modulated waves to be demodulated while substantially excluding oscillations outside the desired band. A restricted section 48 also of the type described in application Serial No. 359,643 may cooperate with the filter 47 to increase the attenuation for certain undesired oscillations. The wave guide terminates in a tunable demodulating chamber 49 provided with an electret 50 which responds to simultaneously impressed electromotive forces of the modulated carrier oscillations received over the wave guide 46 and locally impressed electromotive forces of the unmodulated carrier frequency received over coaxial 51 to reproduce signal or modulating frequency waves and to impress these demodulated signal waves upon coaxial 52. Coaxial 51 is provided with an adjustable telescopic central conductor 53 which may be varied in position to impress unmodulated carrier oscillations upon chamber 49.

It will be understood that since the conversion devices of this invention are essentially asymmetric reactances they afford a possibility of a much more efficient energy conversion than do the commonly used asymmetric devices which depend upon a non-linear resistive component of impedance. In such non-linear resistive component devices most of the impressed energy is dissipated as heat and the conversion efficiency may be of the order of 5 per cent.

It is to be understood that although the invention has been illustrated as embodied in certain specific forms, it is not to be restricted thereto but only by the scope of the appended claims.

What is claimed is:

1. A non-linear translating device for alternating electric currents comprising an electret consisting of two separated conducting members, a fixed dielectric located between the members permanently prepolarized to electric saturation and a source of biasing potential connected between the conducting elements by a path of high impedance to alternating currents of the frequency of the alternating electromotive force to which the device is to be subjected.

2. In combination, wave guide section resonant at a given frequency, the wave guide section being atmospherically sealed and a shunt path across the guide including an electret.

3. In combination, a resonant electrical chamber, a shunt path across the interior of the chamber comprising an electret and a tuning device in series.

4. In combination, a physically closed electrically resonant system, an interior path in shunt to the system including an electret and a desiccating means within the system.

5. A wave guide, a resonant electrical cavity coupled thereto by an aperture common to the guide and the cavity, an electret within the cavity, and means for tuning the cavity at will.

6. A harmonic generator comprising a source of base frequency oscillations, an electrically saturated electret exhibiting a non-linear impedance for impressed alternating electromotive forces means for impressing oscillations from the source upon the electret, output terminals electrically connected to the electret and means connectd to the terminals for selecting therefrom resultant electrical oscillations of a frequency which is a multiple of that of the base frequency oscillations.

7. A wave guide system comprising a tunable chamber, an electrically saturated electret connected to two interior points of the chamber between which a high difference of potential tends to exist, and means for simultaneously introducing within the chamber oscillations of a carrier frequency and oscillations corresponding to signals in accordance with which the carrier is to be modulated.

8. In combination, a source of alternating electromotive force of a given fundamental frequency, a fixed dielectric permanently electrically saturated electret connected thereto and electrically selective output means connected to the electret to selectively withdraw therefrom oscillations, the frequency of which is a multiple of the given fundamental frequency.

9. An energy transmission system comprising a hollow wave guide and an electret within the guide and electrically connected between two points which are at different potential when the guide is operating to transfer energy.

10. A modulating system comprising a source of oscillations, a source of varying electrical potentials with which the oscillations are to be intermodulated, and an electrically saturated electret to which both sources are electrically connected.

11. An electrical system for deriving from alternating electric currents of one frequency corresponding oscillations of a different frequency comprising a permanently electrically saturated fixed dielectric electret having conducting members electrically insulated from each other spaced in juxtaposition to opposite faces of the dielectric terminals connected to the conducting members, the characteristic of the electret relating resultant current to alternating electromotive forces applied to its terminals being non-linear, a source of alternating electromotive force of one frequency connected to the terminals and an output circuit selective for currents of a different frequency also connected to the terminals for withdrawing corresponding oscillations of said different frequency.

12. An electrical converting system for deriving from alternating electric currents of one frequency corresponding electrical oscillations of a different frequency comprising a source of alternating current of the one frequency, a non-linear translating device comprising an electrically saturated electret connected to said source, and means connected to the electret for selecting oscillations of said different frequency.

13. In combination, a source of alternating current of a given frequency, a non-linear translating device comprising an electrically saturated electret connected thereto, a resonant closed conducting chamber enclosing the electret and serving to exclude moisture therefrom, and means connected to the chamber to select therefrom oscillations produced by the operation of the electret and of a frequency different from that of said source of alternating current.

GEORGE C. SOUTHWORTH.

REFERENCES CITED

The following references are of record in the file of this patent:

UNITED STATES PATENTS

| Number | Name | Date |
|---|---|---|
| 1,712,993 | Heising | May 14, 1929 |
| 1,885,728 | Keith | Nov. 1, 1932 |
| 1,891,780 | Rutherford | Dec. 20, 1932 |
| 1,908,249 | Hand | May 9, 1933 |
| 1,999,686 | De Amicis | Apr. 30, 1935 |
| 2,106,768 | Southworth | Feb. 1, 1938 |
| 2,106,769 | Southworth | Feb. 1, 1938 |
| 2,129,711 | Southworth | Sept. 13, 1938 |
| 2,142,159 | Southworth et al. | Jan. 3, 1939 |
| 2,153,728 | Southworth | Apr. 11, 1939 |
| 2,163,740 | Wales | June 29, 1939 |